United States Patent
Stregova

(12) 
(10) Patent No.: US 6,592,221 B1
(45) Date of Patent: Jul. 15, 2003

(54) EYE-CONDITIONING AND EYESIGHT-IMPROVING DEVICE

(76) Inventor: Erzsébet Stregova, Szuruny u. 5-7, H-1087 Budapest (HU)

( * ) Notice: Subject to any disclaimer, the term of this patent is extended or adjusted under 35 U.S.C. 154(b) by 0 days.

(21) Appl. No.: 09/959,724
(22) PCT Filed: Aug. 3, 1999
(86) PCT No.: PCT/HU99/00055
§ 371 (c)(1), (2), (4) Date: Nov. 6, 2001
(87) PCT Pub. No.: WO00/72083
PCT Pub. Date: Nov. 30, 2000

(30) Foreign Application Priority Data

May 6, 1999 (HU) .............................. 9901527

(51) Int. Cl.⁷ ................................................ A61B 3/00
(52) U.S. Cl. ......................................... 351/203; 351/46
(58) Field of Search .................... 351/203, 41, 44, 351/46, 45, 49

(56) References Cited

U.S. PATENT DOCUMENTS 3,876,294 A  4/1975 Kanbar et al. ............... 351/46
5,151,720 A * 9/1992 Kanbar ....................... 351/46

FOREIGN PATENT DOCUMENTS

| BE | 368651 | 5/1930 |
| BE | 571083 | 9/1958 |
| BE | 658953 | 8/1966 |
| CH | 447650 | 3/1968 |
| EP | 0 064 118 | 11/1982 |
| FR | 1111613 | 3/1956 |
| FR | 2146547 | 2/1973 |
| HU | 167085 | 3/1975 |

* cited by examiner

Primary Examiner—George Manuel
(74) Attorney, Agent, or Firm—Joseph G. Seeber

(57) ABSTRACT

An eye-conditioning and eyesight-improving device which can be placed in front of the eye and fixed there temporarily, and which has a carrying body supplied with at least two apertures situated in the environment of the axes of the two eyes and adjusting devices having a primary disc, a secondary disc, and a revolving treatment disc connected to either the primary or secondary disc, having a group of treatment forms consisting of eyehole apertures that can be turned so that they are in front of the optical axis setting apertures.

17 Claims, 1 Drawing Sheet

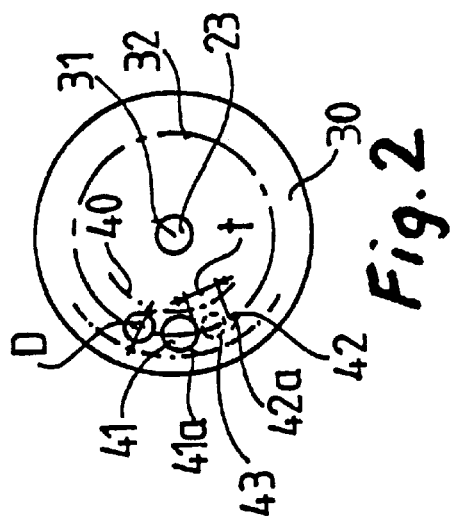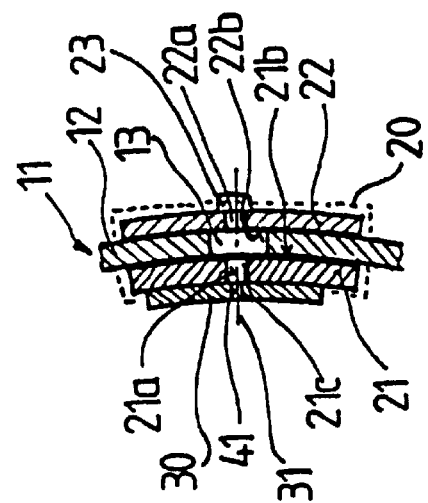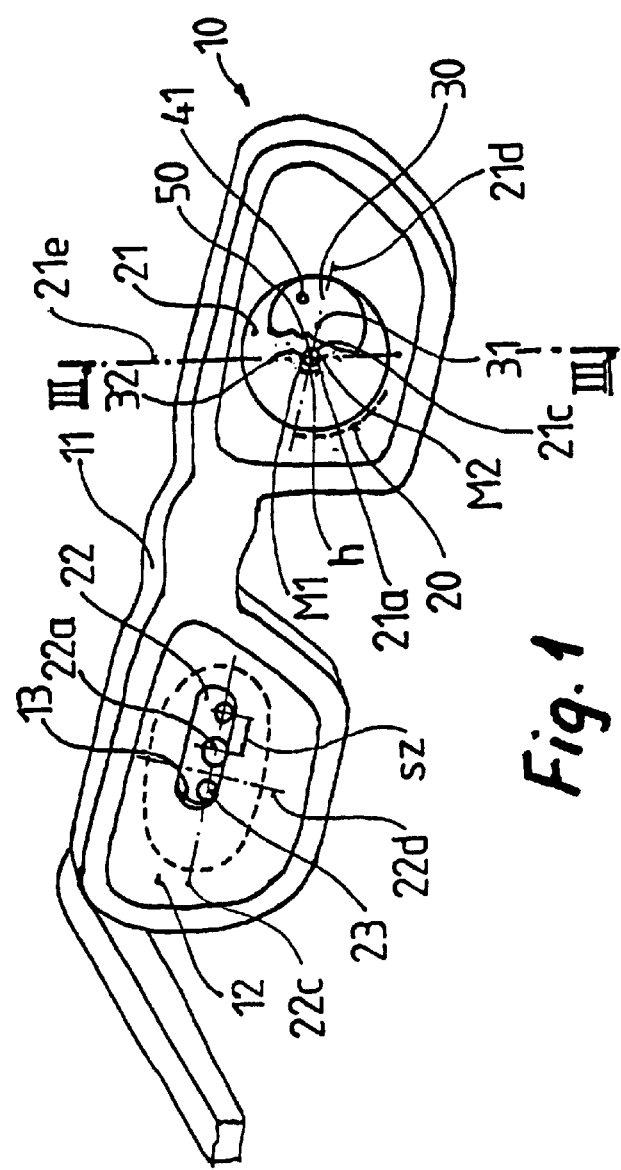

US 6,592,221 B1

EYE-CONDITIONING AND EYESIGHT-IMPROVING DEVICE

TECHNICAL FIELD

The subject of the invention is an eye-conditioning and eyesight-improving device which can be placed in front of the eye and fixed there temporarily, is made from opaque material and which has a carrying body supplied with at least two apertures situated in the environment of the axes of the two eyes and adjusting devices that can be moved with respect to the carrying body and are situated on the apertures of the carrying body and which at least partly cover these apertures, where the said apertures of the carrying body are formed as long openings, the said adjusting devices both have a primary disc and a secondary disc, and connecting devices that connect these together, the primary disc has optical axis setting aperture and the secondary disc also has optical axis setting aperture and these two optical axis setting apertures are least partly situated one on the other, there is a revolving treatment disc connected to either the primary or secondary disc, on the treatment disc there is a group of treatment forms consisting of eyehole apertures of different sizes situated at the same radius from the axis of rotation that can be turned so that they are in front of the optical axis setting apertures.

RELATED ART

Numerous aiding devices have been developed for the correction of the anatomical faults of the eye and for improving eyesight. Optical lenses, e.g. spectacles, contact lenses are used for the correction of so-called "refraction faults". These, however, only normalise the working of the eye by counterbalancing the refraction fault with the refractive indices derived from their material and curvature, in other words the problem is not corrected or reduced with the formation or repair of the structure of the eye.

There are such eyesight improving, eye-conditioning devices in the effect mechanisms of which a basic role is played by the concentrated stimulation and the forced operation of the eye moving muscles and the natural parts of the eye. Such a device is shown in patent description registration No. HU 167.085. The essence of the device is that it contains a darkened shade that is fixed in front of the eyes of the person using the device in which openings of different sizes can be set according to the optical axis of the wearer. The solution operates on the principle of simple magnification and fulfils that function, in other words it helps improve eyesight in such cases when the sight correction could also be attained with spectacle lenses of the appropriate strength.

The disadvantage of this solution is, however, that in those cases when optical lenses of any strength do not help, this device can not be used successfully, either. Another disadvantage is that this sight-improving device can not be used without the use of supplementary devices, e.g. nor for the treatment of childhood strabism.

Patent descriptions BE 368.651, BE 571.083 and FR 2.146.547 also all relate to devices containing rotatable discs that have openings of different sizes. In all of the presented solutions different construction elements make it possible to set the eyehole that is actually in use on the operating disc fitted to the spectacles-like carrying body to the size of the optical axis using it.

The deficiency of the solutions presented in patent descriptions BE 571.083 and BE 368.651, however, is that due to the components used and their connection there is very little possibility to make adjustments in the horizontal direction. Due to this disadvantage the treatment of young children and adults can not be solved using a single carrier body, in order to treat people of different ages and so of different head and optical axis sizes numerous sizes of device need to be used, which would cause an unjustified increase in manufacturing costs.

In the case of patent description FR 2,146,547 the range of setting is larger, but the significant disadvantage of this arrangement is that it contains several setting elements that can be moved in different direction as compared to each other, which makes the handling of the device unnecessarily complex.

DISCLOSURE OF INVENTION

The aim with the eye-conditioning and eyesight-improving device according to the invention was to overcome the deficiencies of the known versions and to create a construction, with the help of which, independently of the distance between the optical axes, with a single device there be the possibility to retain and possibly improve the sight in an eye with a healthy and living optic nerve, and also in the case when the problem can not be treated with optical lenses or other auxiliary device.

The basis of the idea of the invention was formed by the recognition that if the eyehole apertures allowing the eye to see through the shade are set up in a unique fashion, in a composition and with a geometric formation different from known solutions on the treatment disc positioned on the optical axis setting device, and if the setting device is formed in a way different from those known, then the task may be accomplished.

In accordance with the set aim the eye-conditioning and eyesight-improving device according to the invention, —which can be placed in front of the eye and fixed there temporarily, is made from opaque material and which has a carrying body supplied with at least two apertures situated in the environment of the optical axes of the two eyes and adjusting devices that can be moved with respect to the carrying body and are situated on the apertures of the carrying body and which at least partly cover these apertures, where the said apertures of the carrying body are formed as long openings, the said adjusting devices both have a primary disc and a secondary disc, and connecting devices that connect these together, the primary disc has optical axis setting aperture and the secondary disc also has optical axis setting aperture and these two optical axis setting apertures are at least partly situated one on the other, there is a revolving treatment disc connected to either the primary or secondary disc, on the treatment disc there is a group of treatment forms consisting of eyehole apertures of different sizes situated at the same radius from the axis of rotation that can be turned so that they are in front of the optical axis setting apertures, —is constructed in such a way that the primary disc (21) ellipse form with a longer main axis (21d) and a shorter main axis (21e), the optical axis setting aperture (21a) and the connecting bodies (23) are fitted together on the longer main axis (21d) of the primary disc (21), the sections (sz) between the optical axis setting aperture (21a) and the connecting bodies (23) are unequal sizes, and the connecting bodies (23) are fitted into the aperture (13) of the carrying body (10) and/or the secondary disc (22) ellipse form with a longer main axis (22c) and a shorter main axis (22d), the optical axis setting aperture (22a) and the connecting bodies (23) are fitted together on the longer main axis (22c) of the secondary disc (22), the sections (sz) between the optical axis setting aperture (22a) and the connecting bodies (23) are unequal sizes.

Another criteria of the eye-conditioning and eyesight-improving device according to the invention is that the optical axis setting aperture (21a) of the primary disc (21) is situated displaced as compared to the shorter main axis (21e) and the optical axis setting aperture (22a) of the secondary disc (22) is situated displaced as compared to the shorter main axis (22d).

Another favourable aspect of the constructed form can be that at least one of the group of eyehole apertures (41, 42) forming the treatment forms (40) is supplemented with a closing member (43) that is opaque to light and is regularly fitted between the eyehole apertures (41, the distance (t) between the edges of the eyehole apertures (41, 42) neighboring the closing member (43) on the pitch circle (32) is larger or the same as the chord (50) length (h) measured between the circumference (21c) of the optical axis setting aperture (21a) and the points of intersection (M1, M2) of the pitch circle (32).

In a version of the eye-conditioning and eyesight-improving device the number of eyehole apertures set in the treatment disc is 11. Furthermore, the eyehole apertures are circular holes, the diameters of which are in order: 2.5 mm, 2.1 mm, 1.8 mm, 1.6 mm, 1.4 mm, 1.2 mm, 1 mm, 0.9 mm, 0.75 mm, 0.6 mm, 0.5 mm.

From the point of view of the invention a favourable aspect is that the treatment disc is attached to the primary disc and/or the secondary disc in such a way that it may be replaced.

In another version of the eye-conditioning and eyesight-improving device the carrying body is constructed as sunglasses, and the primary discs and secondary discs have curved connection surfaces suiting the form of the lenses of the sunglasses.

An advantage of the eye-conditioning and eyesight-improving device according to the invention is that with its application, even in the case of very weak sight when no optical or other auxiliary device gives help in improving eyesight there is the possibility of increasing the efficiency of a still seeing eye, the deterioration of the eye may be reversed, and so the desired eyesight may be restored.

Another advantage is that due to the application of its unique setting device the eye-conditioning and eyesight-improving device may be used for both children and adults, so independently of the distance between the optical axes it is possible to use the same carrying body, which makes a longer term series of treatments simpler.

Still another advantage is that it may be used, in other words eye conditioning, during carrying out other useful activities, e.g. reading, watching television, etc., and so treatment does not require separate time that can not be devoted to other things, which make more intensive and successful treatment possible.

Another favourable aspect is that the application of the device does not require special knowledge, and so it may be used alone, without supervision, which further increases the chance of the eyesight improving.

BRIEF DESCRIPTION OF DRAWINGS

The eye-conditioning and eyesight-improving device according to the invention is illustrated in detail in the following in connection with construction examples, on the basis of the drawing. In the drawings:

FIG. 1 is a view illustration of a version of the eye-conditioning and eyesight improving device, FIG. 2 is an illustration of the construction of the treatment disc, FIG. 3 is a section drawing of the eye-conditioning and eyesight-improving device according to FIG. 1 taken on plane III.

BEST MODE FOR CARRYING OUT THE INVENTION

On FIG. 1 a version of the eye-conditioning and eyesight-improving device according to the invention can be seen where the carrying body 10 is actually formed by a pair of sunglasses 11. It can be seen that the apertures 13 of the carrying body 10, which are long openings and are worked into the lenses 12 of the sunglasses 11. The connecting devices 23 are fitted in the aperture 13, the task of which is to connect the setting device 20, consisting of the primary disc 21 and the secondary disc 22, to the carrying body 10.

The optical axis setting aperture 21a is positioned on the primary disc 21, while the optical axis setting aperture 22a is positioned on the secondary disc 22 so that they are in front of each other. The treatment disc 30 is also connected to the primary disc 21, which is connected to the primary disc 21 so that it may rotate around the axis of rotation 31. The axis of rotation 31 is preferably coaxial with one of the connecting devices 23, and in the present version the connecting device 23 forms a part of the treatment disc 30, it stands out of it.

On the left hand side of FIG. 1 it can be seen that the secondary disc 22 is an ellipse shaped form with a longer main axis 22c and a shorter main axis 22d, while in this example on the right hand side it can be seen that the primary disc 21 is circular. However, it has to be mentioned here that a version may exist where the primary disc 21 is formed as a ellipse with a longer main axis 21d and a shorter main axis 21e, and even such a construction may be imagined where both the primary disc 21 and the secondary disc 22 are formed as ellipses.

On the secondary disc 22 it can be easily seen that the optical axis setting aperture 22a and the connecting devices 23 are positioned on the longer main axis 22c so that the "sz" sections between the optical axis setting aperture 22a and the individual connecting devices 23 are unequal sizes.

The optical axis setting aperture 22a, however, is not adjusted to the position of the shorter main axis 22d of the secondary disc 22, so the optical axis setting aperture 22a and the connecting devices 23 are actually asymmetrically positioned on the secondary disc 22. The large significance of this is that setting device 20 can be rotated 180° around the optical axis setting aperture 22a, and so depending on the position of the setting device 20 smaller and larger optical axis distances can be formed.

FIG. 2 shows an enlarged view of the treatment disc 30, on which it can be easily seen that the connecting device 23 is in a coaxial position with the axis of rotation 31, and that the centre point of the pitch circle 32 is also formed by the axis of rotation 31. The treatment forms 40 consisting of a series of eyehole apertures are situated on the pitch circle 32. The closing member 43, which is opaque to light, is situated between the largest eyehole aperture 41 with a diameter "D" and the smallest eyehole aperture 42 with "D" diameter.

An important construction requirement is that the "t" distance between the edge 41a of the eyehole aperture 41 and the point of intersection of the pitch circle 32, and between the edge 42a of the eyehole aperture 42 and the point of intersection of the pitch circle 32 should exceed the "h" length of chord 50—as shown in FIG. 1. The chord 50 may be found between the circumference 21c of the optical axis setting aperture 21a of the primary disc 21 and the intersection point "M1" and intersection point "M2" of the pitch circle 32. In the case that this condition is satisfied it is possible for the closing member 43, without letting light through, to completely cover the optical axis setting aperture 21a, and so in this way without using further auxiliary equipment the given eye can be completely shut off from the environment outside the carrying body 10.

As is well illustrated in FIG. 3 the primary disc 21 and the secondary disc 22 of the setting device 20 hold the carrying body 10 between them, that is the lens 12 of the sunglasses 11, and in the case of the appropriate formation of the connecting bodies they clamp the primary disc 21 and the secondary disc 22 together so that due to the friction they can not move on their own as compared to the carrying body 10, that is the lens 12 of the sunglasses 11. In the interest of this the curved connecting surface 21b of the primary disc 21 and the curved connecting surface 22b of the secondary disc 22 are formed so that they follow the curvature of the lens 12 of the sunglasses 11, that is the curved connecting surface 21b looking from the primary disc 21 is concave, while the curved connecting surface 22b from the direction of the secondary disc 22 is convex.

The apertures 13 are made so that they fall in the environment of the optical axis of the person wearing the carrying body 10 —that is here the sunglasses 11 —but they should be large enough so that they can be set for the sizes of the optical axes of both adults and children.

It also turns out from FIG. 3 that the primary disc 21 and the secondary disc 22 of the setting device 20, and the treatment disc are situated so that the primary disc 21 and the secondary disc 22 of the setting device 20 and the treatment disc 30 are situated as compared to the aperture 13 of the lens 12 so that in the case that eyehole opening 41 is rotated in front of the optical axis setting aperture 21a of the primary disc 21, it is possible to see through the eyehole opening through the carrying body 10. A hole with a diameter "D" according to the eyehole opening 41 creates a channel that light may travel through, which consists of the eyehole aperture 41 itself, the optical axis setting aperture 21a, the aperture 13 and the optical axis setting aperture 22a.

The radius between the axis of rotation 31 of the treatment disc 30 and the pitch circle 32 containing the eyehole apertures 41 is just equal to the distance between the centre point of the optical axis setting aperture 21a of the primary disc 21 and the axis of rotation 31, so when rotating the treatment disc 30 always a single eyehole aperture 41 can be turned to the optical axis setting aperture 21a of the primary disc 21.

On using the eye-conditioning and eyesight-improving device according to the invention firstly the setting devices 20 positioned on the carrying body 10 are to be adjusted according to the optical axis of the person using the device. During the setting operation all of the setting devices 20 are to be slipped along the lens 12 of the sunglasses 11 so that two of the optical axis setting apertures 21a of the primary disc 21 fall one along the optical axis of the left eye and one along the optical axis of the right eye. It is advisable to carry out this phase of the setting procedure so that the largest "D" diameter eyehole aperture 41 of the treatment forms 40 the treatment disc 30 is situated in front of the optical axis setting apertures 21a.

On FIG. 1 it can be seen that considering the setting device 20 status of the secondary disc 22 positioned on the left lens 12 of the sunglasses 11 used as a carrying body 10, the optical axis setting aperture 22a is situated on the secondary disc 22 so that with it smaller optical axis distances can be set, e.g. those of children.

When the setting device 20 is rotated by 180° around optical axis setting aperture 21a and optical axis setting aperture 22a, then the optical axis setting aperture 22a —contrary to that shown in FIG. 1 —is positioned on the left hand side of the shorter main axis 22d. Then the setting device 20 can be slipped out further on the lens 12 so that the closed section extending from the connecting device 23 —now facing inwards —of the secondary disc 22 to the edge of the secondary disc 22 still covers the aperture 13. In this turned around state of the setting device larger optical axis distances can be set, like those occurring for adults.

Following the setting of the desired optical axis distance with the rotation of the individual treatment discs 30 the desired size of eyehole aperture 41 or the closing member 43 can be selected from the treatment forms 40 per eye, so that the eyehole aperture 41 with the most appropriate diameter "D" for the eye is placed in front of the optical axis setting aperture 21a of the primary disc 21.

The eye-conditioning and eyesight-improving device according to the invention can be used well for the improvement of eyesight, but also for the conditioning of healthy eyes.

What is claimed is:

1. An eye-conditioning and eyesight-improving device which can be placed in front of the eye and fixed there temporarily, is made from opaque material and which has a carrying body supplied with at least two apertures situated in the environment of the axes of the two eyes and adjusting devices that can be moved with respect to the carrying body and are situated on the apertures of the carrying body and which at least partly cover these apertures, where the said apertures of the carrying body are formed as long openings, the said adjusting devices both have a primary disc and a secondary disc, and connecting devices that connect these together, the primary disc has optical axis setting aperture and the secondary disc also has optical axis setting aperture and these two optical axis setting apertures are at least partly situated one on the other, there is a revolving treatment disc connected to either the primary or secondary disc, on the treatment disc there is a group of treatment forms consisting of eyehole apertures of different sizes situated at the same radius from the axis of rotation that can be turned so that they are in front of the optical axis setting apertures, characterised by that the primary disc (21) ellipse form with a longer main axis (21d) and a shorter main axis (21e), the optical axis setting aperture (21a) and the connecting bodies (23) are fitted together on the longer main axis (21d) of the primary disc (21), the sections (sz) between the optical axis setting aperture (21a) and the connecting bodies (23) are unequal sizes, and the connecting bodies (23) are fitted into the aperture (13) of the carrying body (10) and/or the secondary disc (22) ellipse form with a longer main axis (22c) and a shorter main axis (22d), the optical axis setting aperture (22a) and the connecting bodies (23) are fitted together on the longer main axis (22c) of the secondary disc (22), the sections (sz) between the optical axis setting aperture (22a) and the connecting bodies (23) are unequal sizes.

2. The eye-conditioning and eyesight-improving device according to claim 1 characterised by that the optical axis setting aperture (21a) of the primary disc (21) is situated displaced as compared to the shorter main axis (21e) and the optical axis setting aperture (22a) of the secondary disc (22) is situated displaced as compared to the shorter main axis (22d).

3. The eye-conditioning and eyesight-improving device according to claim 2 characterised by that at least one of the group of eyehole apertures (41, 42) forming the treatment forms (40) is supplemented with a closing member (43) that is opaque to light and is regularly fitted between the eyehole apertures (41, 42), the distance (t) between the edges of the eyehole apertures (41, 42) neighbouring the closing member (43) on the pitch circle (32) is larger or the same as the chord (50) length (h) measured between the circumference (21c) of the optical axis setting aperture (21a) and the points of intersection (M1, M2) of the pitch circle (32).

4. The eye-conditioning and eyesight-improving device according to claim 3 characterised by that the number of eyehole apertures (41, 42) set in the treatment disc (30) is 11.

5. The eye-conditioning and eyesight-improving device according to claim 4 characterised by that the eyehole apertures (41, 42) are circular holes, the diameters (D) of which are in order: 2.5 mm, 2.1 mm, 1.8 mm, 1.6 mm, 1.4 mm, 1.2 mm, 1 mm, 0.9 mm, 0.75 mm, 0.6 mm, 0.5 mm.

6. The eye-conditioning and eyesight-improving device according to claim 5 characterised by that the treatment disc (30) is attached to the primary disc (21) and/or the secondary disc (22) in such a way that it may be replaced.

7. The eye-conditioning and eyesight-improving device according to claim 6 characterised by that the carrying body (10) is constructed as sunglasses (11), and the primary discs (21) and secondary discs (22) have curved connection surfaces (21b, 22b) suiting the form of the lenses (12) of the sunglasses (11).

8. The eye-conditioning and eyesight-improving device according to claim 5 characterised by that the carrying body (10) is constructed as sunglasses (11), and the primary discs (21) and secondary discs (22) have curved connection surfaces (21b, 22b) suiting the form of the lenses (12) of the sunglasses (11).

9. The eye-conditioning and eyesight-improving device according to claim 4 characterised by that the treatment disc (30) is attached to the primary disc (21) and/or the secondary disc (22) in such a way that it may be replaced.

10. The eye-conditioning and eyesight-improving device according to claim 4 characterised by that the carrying body (10) is constructed as sunglasses (11), and the primary discs (21) and secondary discs (22) have curved connection surfaces (21b, 22b) suiting the form of the lenses (12) of the sunglasses (11).

11. The eye-conditioning and eyesight-improving device according to claim 3 characterised by that the eyehole apertures (41, 42) are circular holes, the diameters (D) of which are in order: 2.5 mm, 2.1 mm, 1.8 mm, 1.6 mm, 1.4 mm, 1.2 mm, 1 mm, 0.9 mm, 0.75 mm, 0.6 mm, 0.5 mm.

12. The eye-conditioning and eyesight-improving device according to claim 3 characterised by that the treatment disc (30) is attached to the primary disc (21) and/or the secondary disc (22) in such a way that it may be replaced.

13. The eye-conditioning and eyesight-improving device according to claim 3 characterised by that the carrying body (10) is constructed as sunglasses (11), and the primary discs (21) and secondary discs (22) have curved connection surfaces (21b, 22b) suiting the form of the lenses (12) of the sunglasses (11).

14. The eye-conditioning and eyesight-improving device according to claim 2 characterised by that the treatment disc (30) is attached to the primary disc (21) and/or the secondary disc (22) in such a way that it may be replaced.

15. The eye-conditioning and eyesight-improving device according to claim 2 characterised by that the carrying body (10) is constructed as sunglasses (11), and the primary discs (21) and secondary discs (22) have curved connection surfaces (21b, 22b) suiting the form of the lenses (12) of the sunglasses (11).

16. The eye-conditioning and eyesight-improving device according to claim 1 characterised by that the treatment disc (30) is attached to the primary disc (21) and/or the secondary disc (22) in such a way that it may be replaced.

17. The eye-conditioning and eyesight-improving device according to claim 1 characterised by that the carrying body (10) is constructed as sunglasses (11), and the primary discs (21) and secondary discs (22) have curved connection surfaces (21b, 22b) suiting the form of the lenses (12) of the sunglasses (11).

* * * * *